United States Patent Office 3,219,594
Patented Nov. 23, 1965

3,219,594
PROCESS FOR PREPARING POLYMERS CONTAINING ALUMINUM, OXYGEN AND SILICON IN THE POLYMERIC CHAIN
William Randall Bamford, West Kilbride, Scotland, assignor to Imperial Chemical Industries Limited, London, England, a corporation of Great Britain
No Drawing. Filed Mar. 26, 1962, Ser. No. 182,671
Claims priority, application Great Britain, Apr. 6, 1961, 12,381/61
11 Claims. (Cl. 260—2)

The present invention relates to new and useful polymeric materials and more particularly to such materials wherein the polymeric chains are made up of recurring groups containing silicon, oxygen and aluminum atoms.

A wide variety of polymeric materials containing silicon are known and many of these are used extensively because of their valuable and advantageous properties. It has also been proposed to form polymers in which the polymeric chain contains aluminum atoms in addition to silicon and oxygen atoms. The hitherto prepared polymers of this type have not had in most cases, the most desirable properties and thus they have not come into general use.

An object of the present invention is to provide a process for the production of new and useful polymers containing silicon and aluminum. Another object is to provide such new and useful polymers which can readily be prepared by an economic and easily reproducible process. Other objects will appear hereinafter.

According to the present invention these objects are accomplished by a process comprising reacting together a diacyloxysilicon compound and a diorganophosphinoxy-aluminum dialkoxide.

A wide variety of diacyloxysilicon compounds may be used in the process of our invention. In these compounds the two acyloxy groups may or may not be attached to the same silicon atom. One class in which both acyloxy groups are attached to the same silicon atom consists of the diorganodiacyloxy silanes. Other classes of compounds which may be used include the bis(acyloxydiorganosilyl)benzenes such as 1,4-bis(acyloxydiphenylsilyl) benzenes, the bis(acyloxydiorganosilyl)diphenyls such as 4,4'-bis,acyloxydimethylsilyl)diphenyl, the bis-(acyloxydiorganosilyl)diphenyl ethers such as 4,4'-bis-acyloxydimethylsilyl)diphenyl ether and 1,3 - diacyloxydisiloxanes such as 1,3-diacetoxytetraphenyldisiloxane. In the diacyloxysilicon compound the organo groups attached to silicon may be, in addition to those stated above, lower alkyl groups such as methyl, ethyl, propyl, or butyl groups, aryl groups such as phenyl groups or unsaturated groups such as vinyl or allyl groups. The acyloxy groups may be, for example, acetoxy, propionoxy, butyroxy, isobutyroxy or phenylacetoxy groups. It is, however, in general preferred that the acyloxy groups be acetoxy groups because of the ease of preparation of the diacetoxysilicon compounds and the reactivity thereof. Suitable acyloxysilicon compounds which may be used include, for example, dimethyldiacetoxysilane, dimethyldipropionoxysilane, diethyldiacetoxysilane, 1,4-bis(acetoxydimethylsilyl)benzene, diphenyl(diacetoxysilane, 4,4'-bis(acetoxydimethyl)diphenyl, diacetoxymethylvinylsilane and 1,3-diacetoxytetraphenyldisiloxane.

The diorganophosphinoxyaluminum dialkoxide used in the process of our invention may be prepared by reacting a diorganophosphinic acid with an aluminum alkoxide. In the diorganophosphinic acids used the organo groups may be lower alkyl groups such as methyl, ethyl, propyl or butyl groups or may be aryl groups such as phenyl groups. The alkoxy groups in the aluminum alkoxide may be ethoxy, n-propoxy, iso-propoxy, n-butoxy, iso-butoxy or sec-butoxy groups.

In the preparation of the diorganophosphinoxyaluminum dialkoxide the diorganophosphinic acid and the aluminum alkoxide are normally reacted in the presence of a suitable solvent. Any solvent which is inert to the reactants may be used. It is however, preferred to use a solvent which will form an azeotrope with the alcohol produced by the reaction and to carry out the reaction at the distillation temperature of this azeotrope whereby all of the alcohol formed is removed from the reaction mixture. If desired, any remaining solvent may be removed by distillation and the diorganophosphinoxyaluminum dialkoxide further purified, for example, by sublimation under vacuum. The diorganophosphinic acid and the aluminum alkoxide should, of course, be used in substantially equimolecular proportions so that only one alkoxy group is removed and the desired product is obtained.

The diorganophosphinoxyaluminum dialkoxide used in making the polymers of our invention may either be used in the solvent in which it is prepared or may first be separated therefrom and, if desired, purified. In reacting it with the diacyloxysilicon compound substantially equimolecular proportions are used so that the desired polymers are obtained and polymers containing reactive acyloxy or alkoxy groups are avoided. The two reactants are normally reacted in an inert solvent, preferably one which forms an azeotropic mixture with the alkyl acylate formed during the reaction. The reaction is normally carried out by heating such a mixture at a temperature at which the azeotrope will distill off and thereby removing the alkyl acylate. Any solvent which is inert to the reactants may be used. Suitable solvents include benzene, toluene, hexane, methylcyclohexane, heptane and dipropyl ether.

If desired the reaction may be carried out in the presence of a small quantity, for example, up to 1 percent by weight of the diacyloxysilicon compound, of a catalyst which may be a metal salt or oxide such as for example, dibutyltin oxide, dibutyltin dilaurate and ferric chloride.

The products of our invention may be used in a variety of applications. Thus many are useful as the basis of filled thermosetting moulding compositions while others are of value because of their film or fibre forming properties. The most useful filler for the moulding composition is asbestos but other fillers may be used particularly if high heat resistance is not a prime essential.

Our invention is further illustrated by the following examples in which all parts and percentages are by weight.

*Example 1*

35.5 parts of aluminum isopropoxide, 16.35 parts of dimethylphosphinic acid and 400 parts of dry benzene were heated under reflux for a period of 2 hours. The solvent was then slowly removed by distillation and 400 parts of benzene added to the residue. This mixture was then heated under reflux for a further 2 hours after which the benzene was again slowly removed by distillation. The residue obtained was purified by sublimation at a pressure of 0.1 mm. Hg. There was thus obtained 32 parts of a white solid of melting point 95° C. Analysis of this product gave Al, 11.1 percent; P, 12.9 percent. These compare with theoretical figures of Al, 11.32 percent; P, 13.01 percent. The dimethylphosphinoxyaluminum diisopropoxide so obtained was dissolved in 200 parts of dry benzene and heated under reflux for 4 hours with a solution of 23.7 parts of dimethyldiacetoxysilane in 200 parts of dry benzene. Removal of the solvent by distillation gave 28 parts of a white powder of melting point about 280° C. This material when mixed with equal parts of asbestos fibre gave a composition capable of being thermoset to a product having outstanding thermal resistance.

Example 2

The procedure of Example 1 was repeated. In this case however 3 parts of a 10 percent solution of dibutyltin oxide in isopropyl acetate were added at the same time as the dimethyldiacetoxysilane and the reaction period was reduced to 30 minutes. There was thus obtained 28 parts of a white powder with properties similar to those of the product of Example 1.

Example 3

10.2 parts of aluminum isopropoxide and 4.7 parts of dimethylphosphinic acid were reacted in the manner described in Example 1. The crude dimethylphosphinoxyaluminum diisopropoxide so obtained was heated under reflux with 8.8 parts of dimethyldiacetoxysilane in 100 parts of dry benzene for a period of 4 hours. The solvent was then slowly removed by distillation to give 10.6 parts of a white powder of melting point of about 270° C. This powder was capable of being thermoset on heating at 360° C.

Example 4

47.6 parts of dimethylphosphinoxyaluminum diisopropoxide prepared and purified as described in Example 1 were heated under reflux with 40.8 parts of diethyldiacetoxysilane and 4 parts of a 10 percent solution of dibutyltin oxide in isopropyl acetate in a total of 600 parts of dry benzene for 8 hours. The solvent was then slowly removed by distillation giving 48 parts of a white powder. This powder fused at about 280° C. When mixed with an equal number of parts of asbestos it gave a composition capable of being thermoset to a product having good temperature resistant properties by heating at 360° C.

Example 5

The procedure of Example 4 was repeated except that the diethyldiacetoxysilane was replaced by 62 parts of 1,4-bis(acetoxydimethylsilyl)benzene and the benzene by 800 parts of dry hexane. The mixture was heated under reflux for 2 hours after which the solvent was slowly removed by distillation. The product obtained was heated for 30 minutes at 220° C. under a pressure of 11 mm. Hg. There was thus obtained 69 parts of a tough thermoplastic solid which softened at 200° C. and was capable of being drawn into fibres.

Example 6

47.6 parts of dimethylphosphinoxyaluminum diisopropoxide prepared as in Example 1 were dissolved in 400 parts of dry benzene and added to a mixture of 31 parts of 1,4-bis(acetoxydimethylsilyl)benzene and 17.6 parts of dimethyldiacetoxysilane in 600 parts of dry benzene and 2 parts of a 10 percent solution of dibutyltin oxide in isopropyl acetate. This mixture was heated under reflux for 4 hours after which the solvent was removed by distillation. This gave 56 parts of a white powder which softened at 300° C. but which became hard and brittle on heating at 350° C.

Example 7

The procedure of Example 4 was repeated except that the diethyldiacetoxysilane was replaced by 60 parts of diphenyldiacetoxysilane. The product was heated at 200° C. for 3 hours to give 68 parts of a resinous solid which gave a clear melt on heating at 230–240° C. A portion of this material was mixed with an equal number of parts of asbestos and heated at 320° C. in a mould under pressure to give a product which was hard and heat resistant.

Example 8

The procedure of Example 4 was repeated except that the diethyldiacetoxysilane was replaced by 77.2 parts of 4,4'-bis(acetoxydimethylsilyl)diphenyl. There was obtained 84 parts of a white powder which melted at 195° C. This product was capable of being drawn into fibres.

Example 9

The procedure of Example 4 was repeated except that the diethyldiacetoxysilane was replaced by 37.6 parts of diacetoxymethylvinylsilane. 46 parts of a white powder which melted at 300–310° C. were obtained. This powder was capable of being thermoset by heating at 360° C.

Example 10

218 parts of diphenylphosphinic acid and 204 parts of aluminum isopropoxide were heated under reflux with 5000 parts of toluene for four hours. The solvent was then distilled off slowly. The residue was suspended in 5000 parts of toluene and 176 parts of dimethyldiacetoxysilane added thereto. This mixture was heated under reflux for four hours after which the solvent was slowly distilled off. The residue obtained was heated at 200° C. under a pressure of 11 mm. Hg. There was thus obtained 340 parts of a white powder which had outstanding thermal resistance.

Example 11

23.8 parts of dimethylphosphinoxyaluminum diisopropoxide prepared as in Example 1 and 49.8 parts of 1,3-diacetoxytetraphenyldisiloxane in 600 parts of methylcyclohexane were heated under reflux for two hours. The solvent was then slowly distilled off and replaced by a further 600 parts of methylcyclohexane which was subsequently distilled off after the mixture had been heated under reflux for a further two hours. 54 parts of a white powder were obtained thereby. This powder softened at 140–160° and was capable of forming hard brittle thermoplastic films, and when mixed with equal parts of asbestos gave a composition which could be thermoset by heating at 320° C.

What we claim is:

1. A process for the production of polymers capable of forming films and fibers and having polymeric chains made up of recurring groups containing silicon, oxygen and aluminum atoms, said process comprising heating together a diacyloxy silicon compound selected from the group consisting of diacyloxydiorgano silanes, bis-(acyloxydiorganosilyl) aromatic hydrocarbons, bis(acyloxydiorganosilyl) aromatic hydrocarbon ethers and diacyloxytetraorganodisiloxanes with a diorganophosphinoxyaluminum dialkoxide in the presence of a solvent which is inert to said reactants, said reactants being in substantially equimolecular proportions.

2. New and useful polymers produced by the process of claim 1.

3. A process as claimed in claim 1 wherein the solvent is one which forms an azeotrope with the alkyl acylate produced during the reaction and the reaction is carried out at the distillation temperature of said azeotrope.

4. A process is claimed in claim 1 wherein the diacyloxy silicon compound is a bis(acyloxydiorganosilyl) benzene.

5. A process as claimed in claim 1 wherein the diacyloxy silicon compound is a bis-acyloxydiorganosilyl)-diphenyl ether.

6. A process as claimed in claim 1 wherein the diorganophosphinoxyaluminum dialkoxide is prepared by reacting together a diorganophosphinic acid and an aluminum alkoxide.

7. A process as claimed in claim 1 wherein the organo groups in the diorganophosphinoxy group are selected from the group consisting of methyl, ethyl, propyl, butyl and phenyl groups.

8. A process as claimed in claim 1 wherein the alkoxide groups in the diorganophosphinoxyaluminum alkoxide are selected from the group consisting of ethoxy, n-propoxy, isopropoxy, n-butoxy, isobutoxy and sec-butoxy groups.

9. A process as claimed in claim 1 wherein the diacyloxysilicon compound is reacted with the diorganophosphinoxyaluminum dialkoxide in the presence of a solvent which forms an azeotropic mixture with the alkyl acylate formed during the reaction.

10. A process as claimed in claim 1 wherein the reaction is carried out in the presence of up to 1 percent, by weight of the diacyloxysilicon compound, of a catalyst selected from the group consisting of dibutyltin oxide, dibutyltin dilaurate and ferric chloride.

11. A process as claimed in claim 1 wherein the diacyloxysilicon compound is a diorganodiacyloxysilane.

References Cited by the Examiner

UNITED STATES PATENTS 3,002,986  10/1961  Hyde _____ 260—46.5
3,061,587  10/1962  Rust et al. _____ 260—2

OTHER REFERENCES

Andrianov et al.: Journal of Polymer Science, vol. 30 (1955), pp. 513–524.

WILLIAM H. SHORT, *Primary Examiner.*

JOSEPH R. LIBERMAN, *Examiner.*